(12) United States Patent
Kwon (10) Patent No.: US 9,713,999 B2
(45) Date of Patent: Jul. 25, 2017

(54) CURTAIN AIRBAG APPARATUS AND METHOD OF MANUFACTURING THE SAME

(71) Applicant: HYUNDAI MOBIS Co., Ltd., Yongin-si, Gyeonggi-do (KR)

(72) Inventor: Hae Wook Kwon, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/922,808

(22) Filed: Oct. 26, 2015

(65) Prior Publication Data

US 2016/0121838 A1    May 5, 2016

(30) Foreign Application Priority Data

Oct. 29, 2014   (KR) .......................... 10-2014-0148543

(51) Int. Cl.
*B60R 21/232* (2011.01)
*B60R 21/2338* (2011.01)

(52) U.S. Cl.
CPC ........ *B60R 21/232* (2013.01); *B60R 21/2338* (2013.01); *B60R 2021/23382* (2013.01)

(58) Field of Classification Search
CPC ........ B60R 21/232; B60R 2021/23382; B60R 2021/23386; B60R 2021/161
See application file for complete search history.

(56) References Cited

U.S. PATENT DOCUMENTS

| | | | | |
|---|---|---|---|---|
| 6,135,490 A * | 10/2000 | Spary | .................... | B60R 21/213 280/730.2 |
| 6,176,515 B1 * | 1/2001 | Wallner | ................ | B60R 21/232 280/729 |
| 6,273,458 B1 * | 8/2001 | Steffens, Jr. | .......... | B60R 21/232 280/730.2 |
| 6,375,216 B1 * | 4/2002 | Eschbach | .............. | B60R 21/232 280/730.1 |
| 6,454,296 B1 * | 9/2002 | Tesch | .................... | B60R 21/232 280/730.2 |
| 6,505,853 B2 * | 1/2003 | Brannon | ................ | B60R 21/232 280/729 |
| 6,676,154 B2 * | 1/2004 | Fischer | ................. | B60R 21/232 280/729 |
| 6,695,347 B2 * | 2/2004 | Sonnenberg | .......... | B60R 22/195 280/730.2 |
| 6,866,293 B2 * | 3/2005 | Ogata | .................... | B60R 21/213 280/730.2 |
| 6,994,371 B2 * | 2/2006 | Bossecker | ............. | B60R 21/232 280/730.2 |

(Continued)

*Primary Examiner* — Paul N Dickson
*Assistant Examiner* — Timothy Wilhelm
(74) *Attorney, Agent, or Firm* — Paratus Law Group, PLLC (57) ABSTRACT

Provided are a curtain airbag apparatus and a method of manufacturing the same, which may prevent a head of an occupant from being moved forward after coming into contact with an airbag. To this end, according to the curtain airbag apparatus according to the exemplary embodiment of the present invention, a deployment guide is disposed to penetrate a deployment ring coupled to one surface of the airbag, and tightened by expansive force of the airbag to allow the airbag to be bent in a shape that protrudes toward the other surface.

12 Claims, 6 Drawing Sheets

(56) References Cited

U.S. PATENT DOCUMENTS

| | | | | |
|---|---|---|---|---|
| 7,234,728 B2* | 6/2007 | Noguchi | ............... | B60R 21/232 280/730.2 |
| 7,273,228 B2* | 9/2007 | Noguchi | ............... | B60R 21/213 280/728.2 |
| 7,347,446 B2* | 3/2008 | Inoue | ................ | B60R 21/213 280/730.2 |
| 7,347,447 B2* | 3/2008 | Nakanishi | ............ | B60R 21/232 280/730.2 |
| 7,500,694 B2* | 3/2009 | Heudorfer | ............ | B60R 21/232 280/729 |
| 7,712,773 B2* | 5/2010 | Walston | ................ | B60R 21/08 280/730.2 |
| 7,823,922 B2* | 11/2010 | Mitchell | ............... | B60R 21/232 280/730.2 |
| 8,360,469 B2* | 1/2013 | Wiik | ................ | B60R 21/23138 280/730.2 |
| 8,596,673 B2* | 12/2013 | Ruedisueli | ............. | B60R 21/21 280/730.2 |
| 9,114,776 B2* | 8/2015 | Thomas | ............. | B60R 21/2338 |
| 9,333,934 B2* | 5/2016 | Sitko | ................... | B60R 21/213 |
| 2003/0090091 A1* | 5/2003 | Dominissini | ......... | B60R 21/232 280/730.2 |
| 2005/0046159 A1* | 3/2005 | Noguchi | ............... | B60R 21/232 280/730.2 |
| 2005/0127644 A1* | 6/2005 | Kino | ................... | B60R 21/232 280/730.2 |
| 2005/0134026 A1* | 6/2005 | Kumagai | ............. | B60R 21/232 280/730.2 |

* cited by examiner

CURTAIN AIRBAG APPARATUS AND METHOD OF MANUFACTURING THE SAME

CROSS-REFERENCE TO RELATED APPLICATIONS

The present application claims priority to Korean Patent Application Number 10-2014-0148543 filed Oct. 29, 2014, the entire contents of which the application is incorporated herein for all purposes by this reference.

TECHNICAL FIELD

The present invention relates to a curtain airbag apparatus and a method of manufacturing the same, and more particularly, to a curtain airbag apparatus, which is mounted at a side of a vehicle, and a method of manufacturing the same.

BACKGROUND

In general, a vehicle is provided with an airbag that is a safety apparatus inflated by gas that flow into the airbag to protect an occupant at the time of an accident.

The airbag is installed at various portions in the vehicle as necessary, and there are a driver airbag which is mounted in a steering wheel to protect a driver seated in a driver seat, a passenger airbag which is mounted at an upper side of a glove box to protect a passenger seated in a front passenger seat, and a curtain airbag which is mounted at a side of the vehicle to protect a head of the occupant (including both a driver or a passenger).

Among the airbags, the curtain airbag is mounted to be elongated in a front and rear direction of the vehicle, inside an A-pillar and a C-pillar that are disposed at an upper side of a front door and a rear door (hereinafter, referred to as door, for ease of description) through which the occupants get in and out of the vehicle.

When gas flows into the curtain airbag from a gas generator, the curtain airbag is deployed from the upper side of the door while covering a door glass like a curtain, and disposed between the door and the head of the occupant, thereby protecting the head of the occupant at the time of a broadside collision of the vehicle.

However, there are problems in that at the time of an oblique accident of the vehicle (an accident in which a portion between a front side and a lateral side of the vehicle collides with an object), the head of the driver is moved forward while rotating after coming into contact with the curtain airbag, comes out between the driver airbag and the curtain airbag, and collides with a structure of the vehicle, and the head of the passenger seated in the front passenger seat is also moved forward while rotating after coming into contact with the curtain airbag, comes out between the passenger airbag and the curtain airbag, and collides with a structure of the vehicle.

Accordingly, there is a need for a technology that prevents the head of the occupant from being moved forward after coming into contact with the curtain airbag at the time of an oblique collision of the vehicle.

SUMMARY

The present invention has been made in an effort to provide a curtain airbag apparatus and a method of manufacturing the same, which may prevent a head of an occupant from being moved forward after coming into contact with an airbag.

Technical problems of the present invention are not limited to the aforementioned technical problem, and other technical problems, which are not mentioned above, may be clearly understood by those skilled in the art from the following descriptions.

An exemplary embodiment of the present invention provides a curtain airbag apparatus including: an inflatable airbag; a deployment ring which is coupled to one surface of the airbag; and a deployment guide which penetrates the deployment ring and is tightened by expansive force of the airbag to allow the airbag to be bent in a shape that protrudes toward the other surface.

Another exemplary embodiment of the present invention provides a method of manufacturing a curtain airbag apparatus, the method including: a first step of spreading raw fabric of a deployment ring out on an airbag, and coupling a central portion of the raw fabric to the airbag; a second step of coupling both ends of the raw fabric, and completely forming the deployment ring; a third step of spreading a first deployment guide out on the airbag, and coupling a lower end of the first deployment guide to the airbag; a fourth step of spreading a second deployment guide out on the airbag, and coupling a lower end of the second deployment guide to the airbag; a fifth step of allowing an upper end of the first deployment guide to pass through the deployment ring from the lower side to the upper side, and pulling out the upper end of the first deployment guide; a sixth step of allowing an upper end of the second deployment guide to pass through the deployment ring from the lower side to the upper side, and pulling out the upper end of the second deployment guide; a seventh step of folding a lower end of the airbag upward so that the deployment ring is disposed between folded portions of the airbag; an eighth step of coupling the upper end of the first deployment guide to the airbag; and a ninth step of coupling the upper end of the second deployment guide to the airbag.

Other detailed matters of the exemplary embodiment are included in the detailed description and the drawings.

According to the curtain airbag apparatus according to the present invention and the curtain airbag apparatus manufactured by the method of manufacturing the same, the airbag is bent in a shape that protrudes toward the interior of the vehicle as the deployment guide is tightened by expansive force of the airbag, such that the head of the occupant is not moved forward by the protruding airbag, thereby preventing the head of the driver from coming out between the driver airbag and the curtain airbag and colliding with a structure of the vehicle at the time of an oblique collision of the vehicle, and preventing the head of the passenger from coming out between a passenger airbag and the curtain airbag and colliding with a structure of the vehicle.

The effect of the present invention is not limited to the aforementioned effect, and other effects, which are not mentioned above, will be clearly understood by those skilled in the art from the claims.

DETAILED DESCRIPTION

Various advantages and features of the present invention and methods for achieving the advantages and features will be clear with reference to exemplary embodiments described below in detail together with the accompanying drawings. However, the present invention is not limited to the exemplary embodiments set forth below, and may be embodied in various other forms. The present exemplary embodiments are for rendering the disclosure of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Hereinafter, a curtain airbag apparatus according to the exemplary embodiment of the present invention and a method of manufacturing the same will be described with reference to the drawings.

Figure 1:
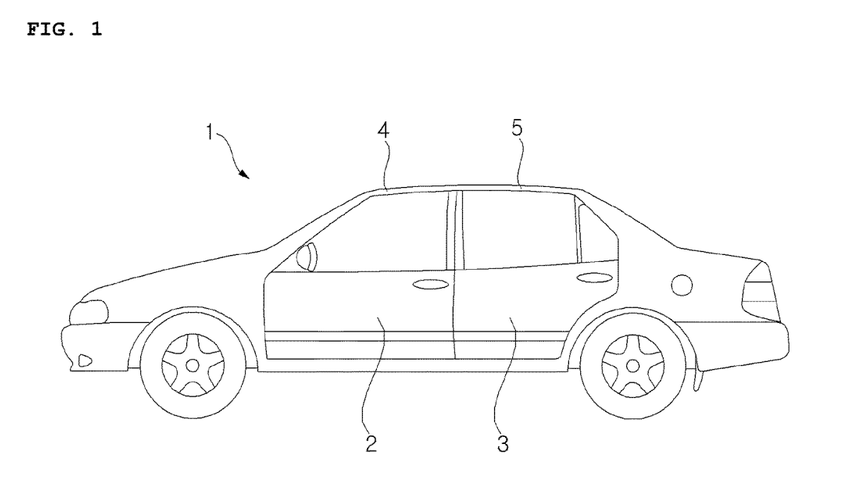
FIG. 1 is a view illustrating a vehicle in which a curtain airbag apparatus according to an exemplary embodiment of the present invention is installed.

FIG. 1 is a view illustrating a vehicle in which a curtain airbag apparatus according to an exemplary embodiment of the present invention is installed.

Referring to FIG. 1, a vehicle 1 in which the curtain airbag apparatus according to the exemplary embodiment of the present invention is mounted has a front door 2 and a rear door through which occupants (including both a driver and a passenger) get in and out of the vehicle 1. An A-pillar 4 is disposed at an upper side of the front door 2, and a C-pillar 5 is disposed at an upper side of the rear door 3.

Figure 2:
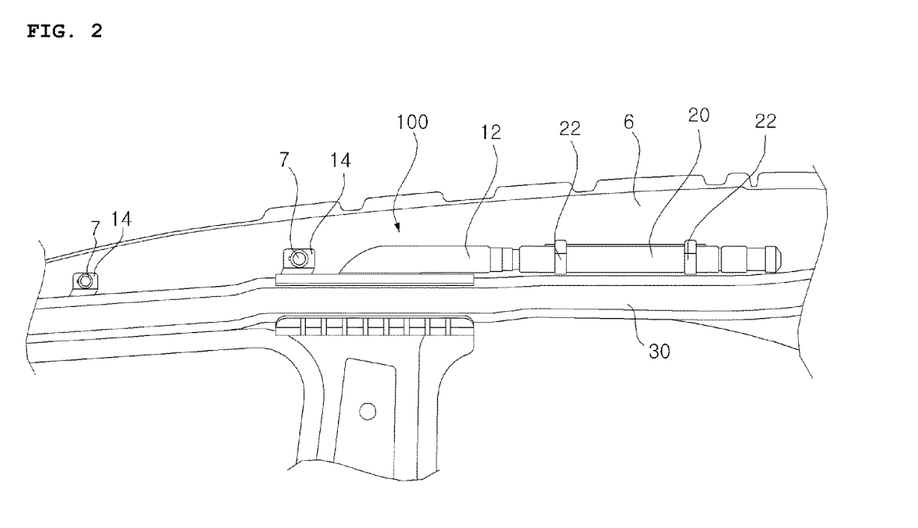
FIG. 2 is a view illustrating a state in which the curtain airbag apparatus according to the exemplary embodiment of the present invention is mounted in the vehicle.
Figure 3:
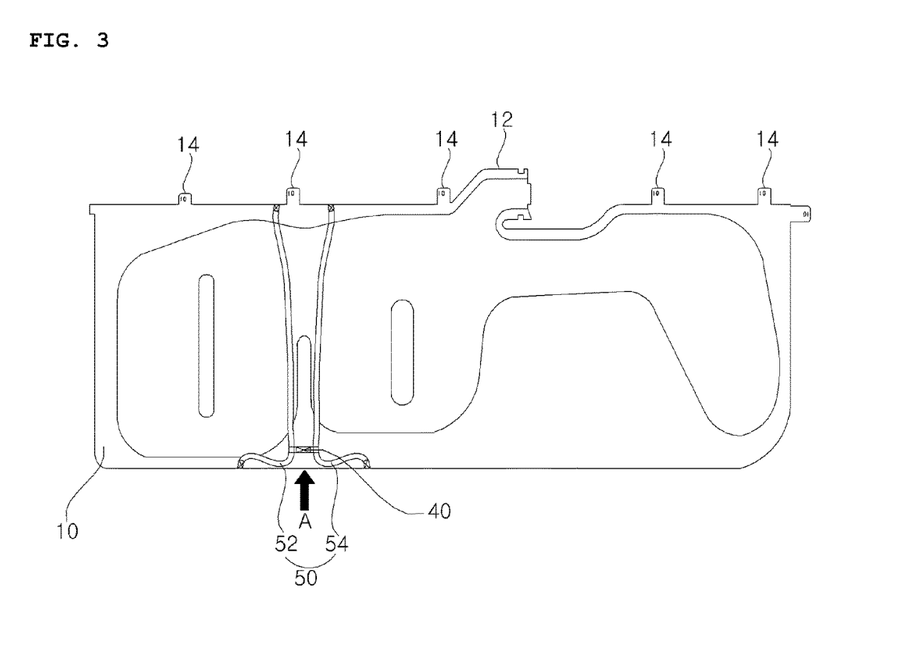
FIG. 3 is a view illustrating a state in which an airbag of the curtain airbag apparatus according to the exemplary embodiment of the present invention is deployed.
Figure 4:
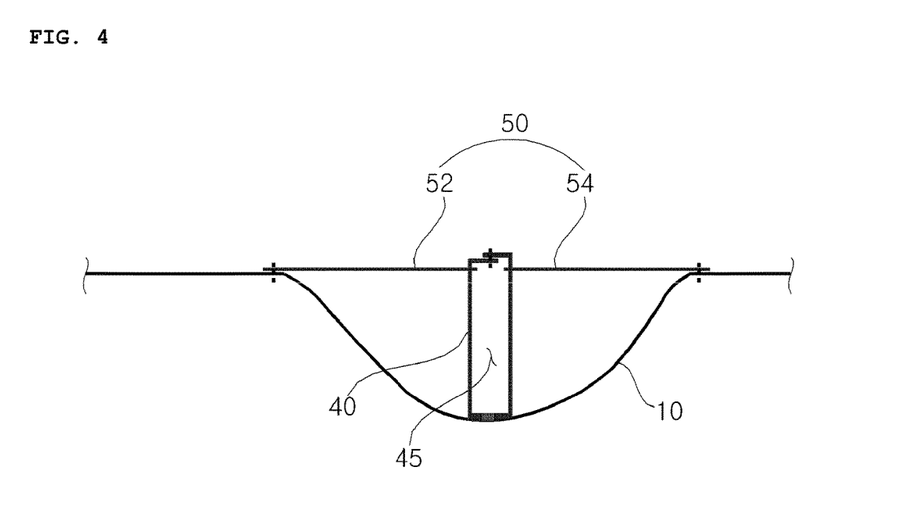
FIG. 4 is a view when viewed in a direction A in FIG. 3.

FIG. 2 is a view illustrating a state in which the curtain airbag apparatus according to the exemplary embodiment of the present invention is mounted in the vehicle, FIG. 3 is a view illustrating a state in which an airbag of the curtain airbag apparatus according to the exemplary embodiment of the present invention is deployed, and FIG. 4 is a view when viewed in a direction A in FIG. 3.

Referring to FIGS. 1 to 4, a curtain airbag apparatus 100 according to the exemplary embodiment of the present invention is mounted on a side inner panel 6 (hereinafter, referred to as a vehicle body), which is disposed inside the A-pillar 4 and the C-pillar 5, so as to be elongated in a front and rear direction. One curtain airbag apparatus 100 is mounted at the left of the vehicle 1 to protect either the driver or the passenger, while the other curtain airbag apparatus 100 is also mounted at the right of the vehicle 1 to protect the other.

The curtain airbag apparatus 100 includes an inflator 20 which generates gas, and an airbag 10 which is connected with the inflator 20 and inflated and deployed when gas generated by the inflator 20 flows into the airbag 10 to protect a head portion of the occupant.

The inflator 20 is coupled to the vehicle body 6 by means of clamps 22.

A gas inlet portion 12, which is connected with the inflator 20 so that gas generated by the inflator 20 may flow into the airbag 10, is formed at a center of an upper side of the airbag 10. An operator inserts a tip portion of the inflator 20, where gas is discharged, into the gas inlet portion 12, and then covers an outer circumferential surface of the gas inlet portion 12 with a clamp (not illustrated), thereby coupling the inflator 20 to the airbag 10.

When the airbag 10 is divided into a front portion and a rear portion based on a central portion, the front portion protects an occupant seated in a front seat (driver seat or front passenger seat) of the vehicle 1, and the rear portion protects an occupant seated in a back seat of the vehicle 1.

A plurality of mounting tabs 14, which is coupled to the vehicle body 6, is formed at the upper side of the airbag 10 along a length of the airbag 10.

The airbag 10 is folded several times and then encapsulated in a cushion cover 30, the gas inlet portion 12 then comes out of the cushion cover 30 and is connected with the inflator 20, and then the mounting tabs 14 come out of the cushion cover 30 and are mounted to the vehicle body 6 by means of fastening members 7.

Since the airbag 10 is encapsulated in the cushion cover 30 and mounted in the vehicle body 6, the cushion cover 30 needs to be torn by expansive force of the airbag 10 so that the airbag 10 is inflated and deployed toward the interior of the vehicle. Therefore, a tear line (not illustrated), which is a line torn by expansive force of the airbag 10, may be formed on the cushion cover 30.

The airbag 10 is manufactured by using two flexible panels. That is, the airbag 10 is completely manufactured by sewing together circumferences of the two flexible panels. When the airbag 10 is completely manufactured, one of the flexible panels defines one surface of the airbag 10, and the other defines the other surface of the airbag 10.

When gas flows into the airbag 10 from the inflator 20, the airbag 10 is deployed toward the interior of the vehicle 1 while being unfolded from the upper side to the lower side of the vehicle 1, and when the deployment is completed, the one surface of the airbag 10 is directed toward the outside of the vehicle 1, and the other surface of the airbag 10 is directed toward the interior of the vehicle 1. That is, at the time of an accident of the vehicle 1, the head of the occupant is protected while coming into contact with the other surface of the airbag 10. In the following description, the one surface of the airbag 10 means a side surface of both side surfaces of the airbag 10 which is directed toward the outside of the vehicle 1 when the airbag 10 is deployed, and the other surface of the airbag 10 means a side surface of both side surfaces of the airbag 10 which is directed toward the interior of the vehicle 1 when the airbag 10 is deployed.

However, there is concern that at the time of an oblique collision of the vehicle 1, the head of the occupant being in contact with the other surface of the airbag 10 will move forward while rotating and collide with a hard structure of the vehicle 1. However, when the airbag 10 of the curtain airbag apparatus 100 according to the exemplary embodiment of the present invention is deployed, the airbag 10 is bent in a shape that protrudes toward the interior of the vehicle, as illustrated in FIG. 4. Therefore, even at the time of an oblique collision of the vehicle 1, the head of the occupant being in contact with the airbag 10 is prevented by the protruding portion of the airbag 10 from being moved forward, thereby preventing the head of the occupant from colliding with a hard structure of the vehicle 1.

As described above, in order to allow the airbag 10 to be bent in a shape that protrudes toward the interior of the vehicle when the airbag 10 is deployed, a deployment ring 40 and a deployment guide 50 are coupled to the airbag 10.

When the airbag 10 is divided into the front portion and the rear portion based on the central portion, the deployment ring 40 and the deployment guide 50 are coupled to the front portion.

The deployment ring 40 and the deployment guide 50 are both made of the same flexible material as the airbag 10. However, the deployment ring 40 and the deployment guide 50 need not be necessarily made of the same material as the airbag 10 as long as the deployment ring 40 and the deployment guide 50 are made of a flexible material.

As illustrated in FIG. 4, a through hole 45 is formed at a center of the deployment ring 40. The deployment guide 50 is inserted into the through hole 45 formed in the deployment ring 40.

The deployment guide 50 is installed to be movable through the through hole 45 formed in the deployment ring 40. Both ends of the deployment guide 50 are coupled to the airbag 10, such that the deployment guide 50 pulls the airbag 10 while being tightened by expansive force of the airbag 10 to allow the airbag 10 to be bent in a shape that protrudes toward the other surface.

An upper end of the deployment guide 50 is sewed on and coupled to an upper end of one surface of the airbag 10, and a lower end of the deployment guide 50 is sewed on and coupled to a lower end of one surface of the airbag 10. Further, the deployment ring 40 is sewed on and coupled to the lower end of one surface of the airbag 10 but slightly above the lower end of the deployment guide 50.

The deployment guide 50 may be formed to have a length that may allow the deployment guide 50 to be tightened while the airbag 10 is deployed. For example, even though the length of the deployment guide 50 is shorter than a length of the airbag 10 in an up and down direction such that the upper end of the deployment guide 50 is coupled to the upper end of one surface of the airbag 10 and the lower end thereof is coupled to the lower end of one surface of the airbag 10, the deployment guide 50 is tightened while the airbag 10 is deployed, thereby allowing the airbag 10 to be bent in a shape that protrudes toward the other surface.

However, in the present exemplary embodiment, the length of the deployment guide 50 is longer than the length of the airbag 10 in the up and down direction. Therefore, if there is no deployment ring 40, the deployment guide 50 cannot be tightened while the airbag 10 is deployed. At least one end of the deployment guide 50 is disposed to be spaced apart from the deployment ring 40 in the front and rear direction, such that the deployment guide 50 may be tightened while the airbag 10 is deployed. In addition, the lower end of the deployment guide 50 may be diagonally disposed to be closer to the front portion of the airbag 10 than the upper end of the deployment guide 50, such that the deployment guide 50 may be tightened while the airbag 10 is deployed. In addition, the lower end of the deployment guide 50 may be diagonally disposed to be closer to the rear portion of the airbag 10 than the upper end of the deployment guide 50, such that the deployment guide 50 may be tightened while the airbag 10 is deployed. In the present exemplary embodiment, a plurality of deployment guides 50 is provided and includes a first deployment guide 52 which has a lower end that is disposed to be closer to the front portion of the airbag 10 than an upper end, and a second deployment guide 54 which has a lower end that is disposed to be closer to the rear portion of the airbag 10 than an upper end.

The upper end of the first deployment guide 52 and the upper end of the second deployment guide 54 are disposed to be spaced apart from each other in the front and rear direction, and the lower end of the first deployment guide 52 and the lower end of the second deployment guide 54 are disposed to be spaced apart from each other in the front and rear direction.

Both of the ends of the first deployment guide 52 are disposed to be spaced forward apart from the deployment ring 40, and both of the ends of the second deployment guide 54 are disposed to be spaced rearward apart from the deployment ring 40. Therefore, the first deployment guide 52 and the second deployment guide 54 receive force by which the first deployment guide 52 and the second deployment guide 54 are pulled by the deployment ring 40 while the airbag 10 is deployed. Therefore, the first deployment guide 52 and the second deployment guide 54 allow the lower end portion of the airbag 10, which is a portion positioned further forward than the head of the occupant, to be bent in a shape that protrudes toward the other surface, and allow the protruding shape to be a shape that is elongated in the up and down direction.

A process of manufacturing the curtain airbag apparatus according to the exemplary embodiment of the present invention, which is configured as described above, will be described below with reference to FIGS. 5 to 11.

Figure 11:
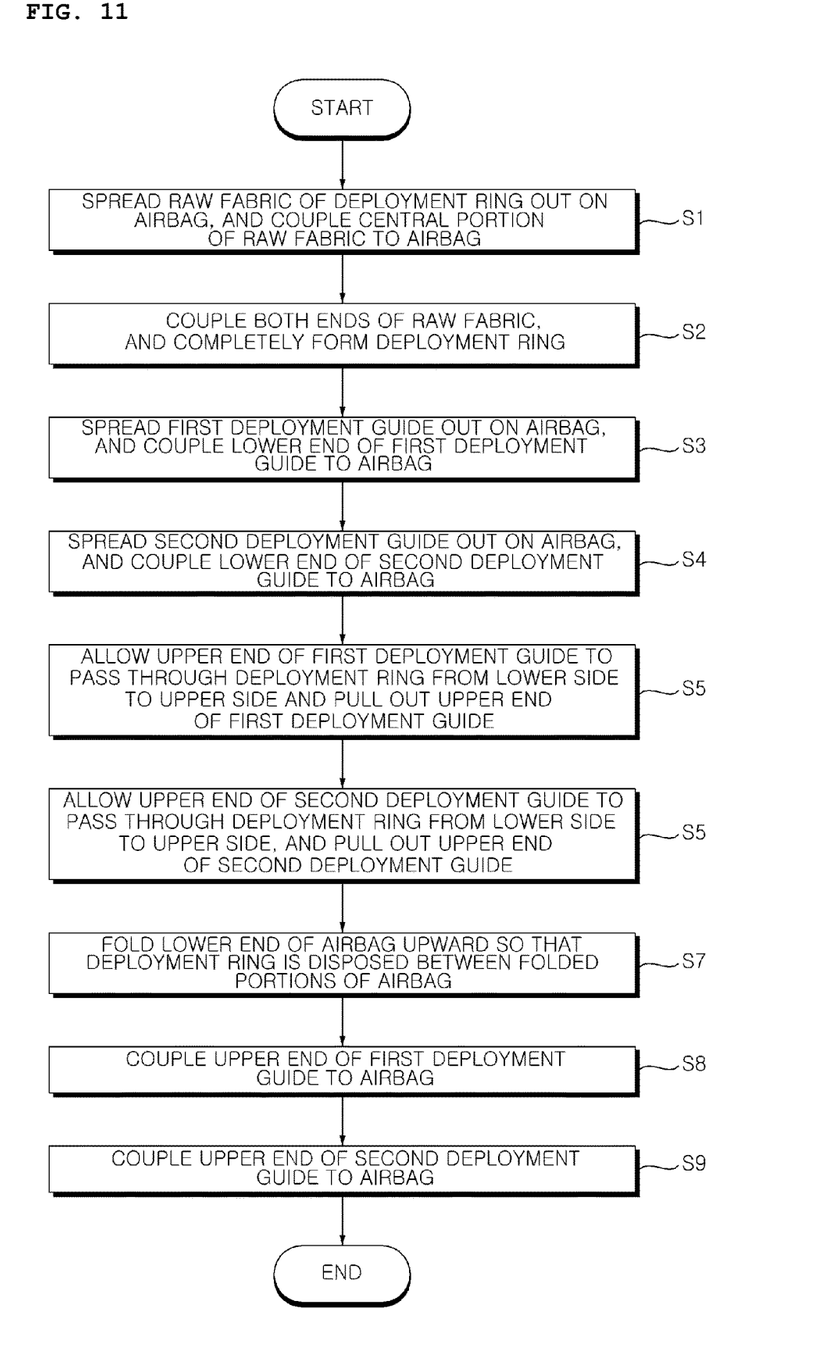
FIG. 11 is a flowchart of a method of manufacturing the curtain airbag apparatus according to the exemplary embodiment of the present invention.

FIG. 11 is a flowchart of a method of manufacturing the curtain airbag apparatus according to the exemplary embodiment of the present invention.

First, a process of coupling the deployment ring 40 to the airbag 10 will be described.

Figure 5:
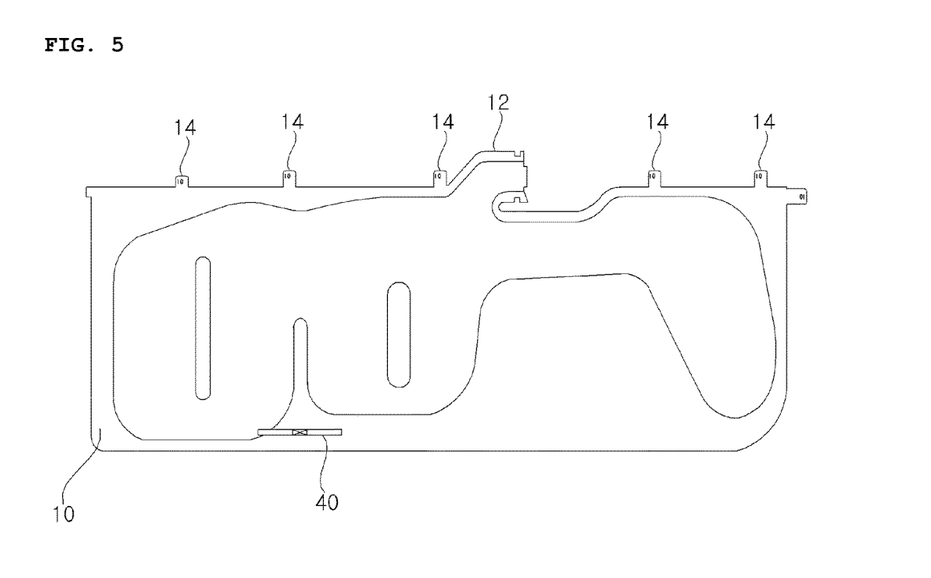
FIG. 5 is a view illustrating a state in which raw fabric, which will be a deployment ring, is initially coupled to the airbag of the curtain airbag apparatus according to the exemplary embodiment of the present invention.

FIG. 5 is a view illustrating a state in which raw fabric, which will be the deployment ring, is coupled to the airbag of the curtain airbag apparatus according to the exemplary embodiment of the present invention.

Referring to FIGS. 5 and 11, raw fabric, which will be the deployment ring 40, is spread out on the airbag 10 to be elongated in a left and right direction, and a central portion of the raw fabric is sewed on and coupled to the airbag 10 (S1).

Figure 6:
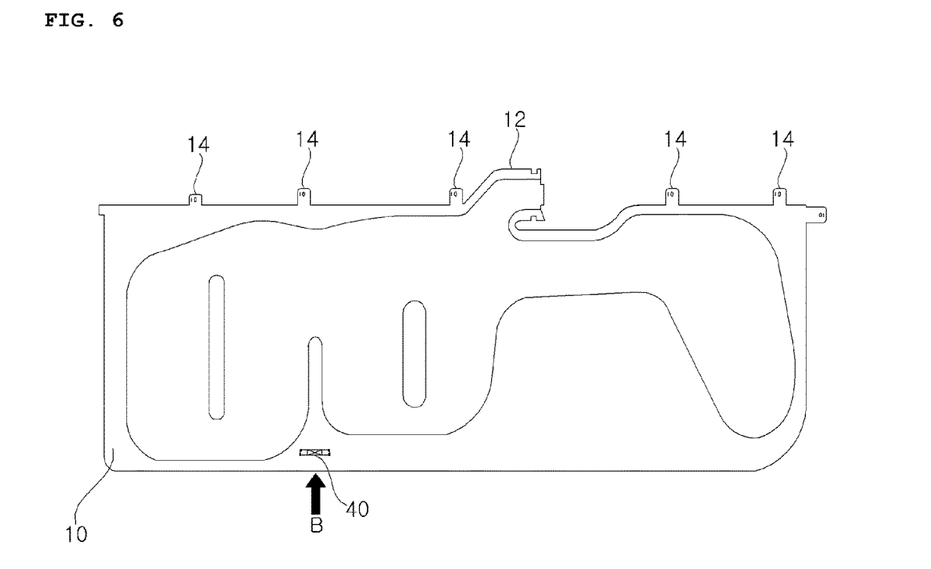
FIG. 6 is a view illustrating a state in which the deployment ring is completely formed from the state as illustrated in FIG. 5.
Figure 7:
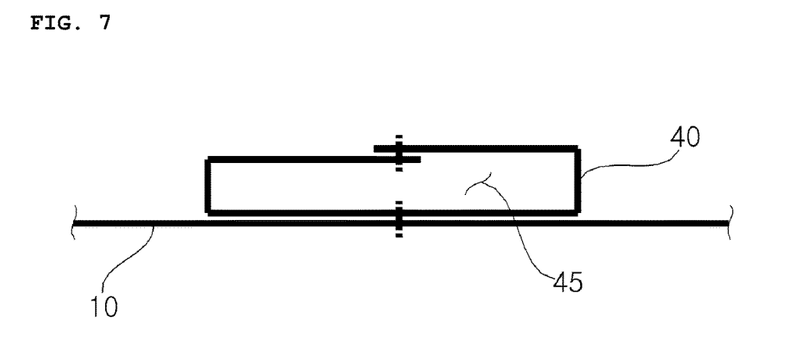
FIG. 7 is a view when viewed in a direction B in FIG. 6.

FIG. 6 is a view illustrating a state in which the deployment ring is completely formed from the state as illustrated in FIG. 5, and FIG. 7 is a view when viewed in a direction B in FIG. 6.

Referring to FIGS. 6, 7 and 11, left and right ends of the raw fabric are then stacked and sewed together such that both ends of the raw fabric are coupled to each other, and as a result, the deployment ring 40 having the through hole 45 is completely formed (S2).

Second, a process of coupling the deployment guide 50 to the airbag 10 will be described.

Figure 8:
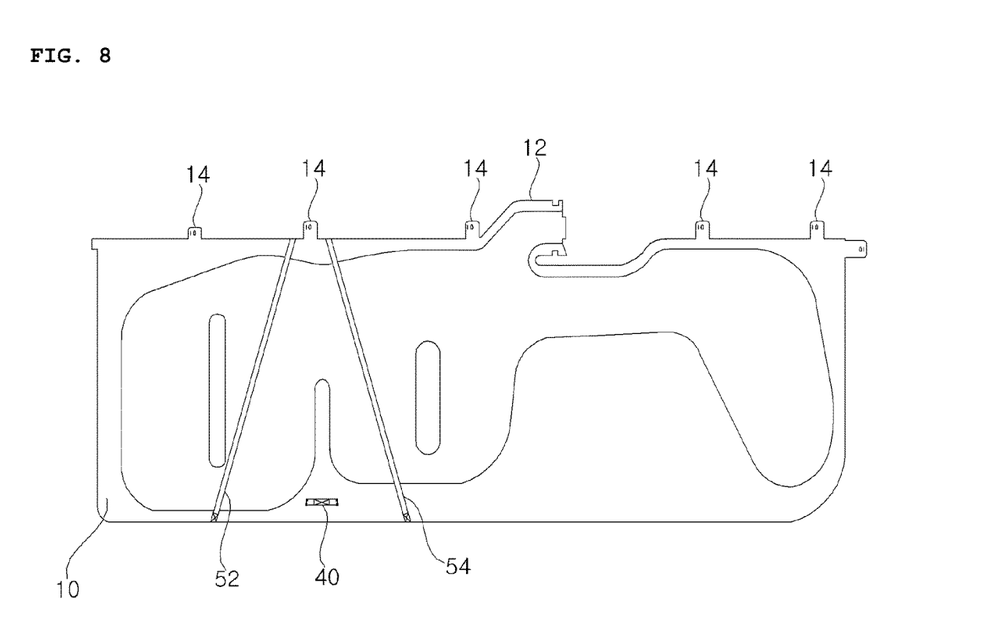
FIG. 8 is a view illustrating a state in which a lower end of a deployment guide is coupled to the airbag of the curtain airbag apparatus according to the exemplary embodiment of the present invention.

FIG. 8 is a view illustrating a state in which the lower end of the deployment guide is coupled to the airbag of the curtain airbag apparatus according to the exemplary embodiment of the present invention.

Referring to FIGS. 8 and 11, the first deployment guide 52 is spread out on the airbag 10 so that the lower end of the first deployment guide 52 is disposed to be spaced forward apart from the deployment ring 40, and the lower end of the first deployment guide 52 is sewed on and coupled to the airbag 10 (S3).

The second deployment guide 54 is spread out on the airbag so that the lower end of the second deployment guide 54 is disposed to be spaced rearward apart from the deployment ring 40, and the lower end of the second deployment guide 54 is sewed on and coupled to the airbag 10 (S4).

Figure 9:
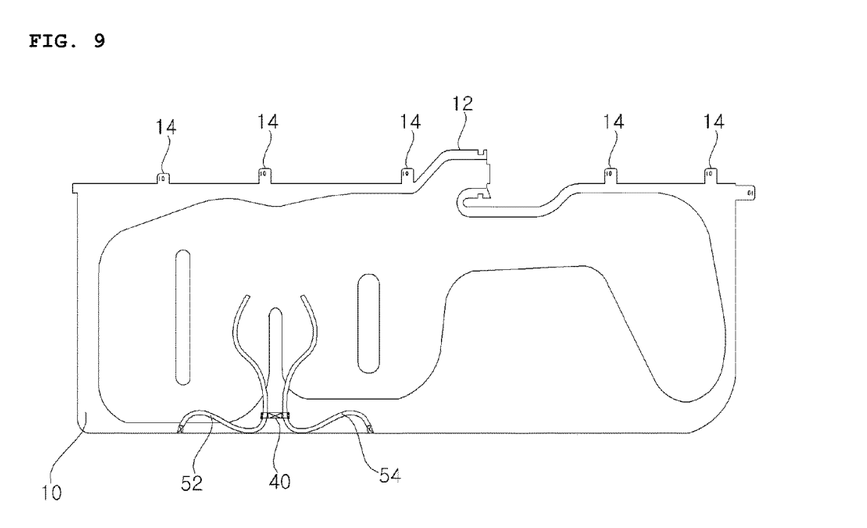
FIG. 9 is a view illustrating a state in which an upper end of the deployment guide is inserted into the deployment ring from the state as illustrated in FIG. 8.

FIG. 9 is a view illustrating a state in which the upper end of the deployment guide is inserted into the deployment ring from the state as illustrated in FIG. 8.

Referring to FIGS. 9 and 11, the upper end of the first deployment guide 52 then passes through the deployment ring 40 from the lower side to the upper side and is pulled out (S5). That is, the first deployment guide 52 penetrates the through hole 45 formed in the deployment ring 40.

The upper end of the second deployment guide 54 passes through the deployment ring 40 from the lower side to the upper side and is pulled out (S6). That is, the second deployment guide 54 penetrates the through hole 45 formed in the deployment ring 40.

Figure 10:
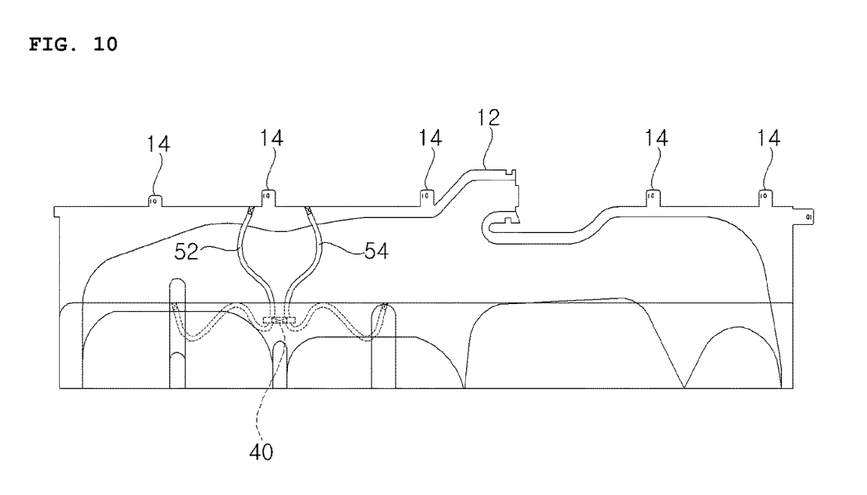
FIG. 10 is a view illustrating a state in which the upper end of the deployment guide is coupled to the airbag from the state as illustrated in FIG. 9.

FIG. 10 is a view illustrating a state in which the upper end of the deployment guide is coupled to the airbag from the state as illustrated in FIG. 9.

Referring to FIGS. 10 and 11, the lower end of the airbag is then folded upward so that the deployment ring 40 is disposed between folded portions of the airbag 10 (S7). In this case, when the lower end of the airbag 10 is folded upward, the lower end of the airbag 10 is folded upward based on a point one-third of the length of the airbag 10 in the up and down direction from the lower end of the airbag 10.

Thereafter, the upper end of the first deployment guide 52 is sewed on and coupled to the airbag 10 (S8).

Thereafter, the upper end of the second deployment guide 54 is sewed on and coupled to the airbag 10 (S9), and a process of coupling the deployment ring 40, the first deployment guide 52 and the second deployment guide 54 to the airbag 10 is completed.

Thereafter, the airbag 10 is further folded so that the airbag 10 is sized to be inserted into the cushion cover 30 illustrated in FIG. 2, and thereafter, the airbag 10 is encapsulated in the cushion cover 30. Because subsequent manufacturing processes may be sufficiently expected from the description associated with FIGS. 1 to 4, the description thereof will be omitted.

As described above, according to the curtain airbag apparatus 100 according to the present invention and the curtain airbag apparatus 100 manufactured by the method of manufacturing the same, the airbag 10 is bent in a shape that protrudes toward the interior of the vehicle as the deployment guide 50 is tightened by expansive force of the airbag 10, such that the head of the occupant is not moved forward by the protruding airbag 10, thereby preventing the head of the driver from coming out between the driver airbag and the curtain airbag and colliding with a structure of the vehicle 1 at the time of an oblique collision of the vehicle, and preventing the head of the passenger from coming out between a passenger airbag and the curtain airbag and colliding with a structure of the vehicle 1.

It may be understood by a person skilled in the art that the present invention may be carried out in other specific forms without changing the technical spirit or the essential characteristics. Thus, it should be appreciated that the exemplary embodiments described above are intended to be illustrative in every sense, and not restrictive. The scope of the present invention is represented by the claims to be described below rather than the detailed description, and it should be interpreted that all the changes or modified forms, which are derived from the meaning and the scope of the claims, and the equivalents thereto, are included in the scope of the present invention.

What is claimed is:

1. A curtain airbag apparatus comprising:
   an inflatable airbag;
   a single deployment ring including a central portion fixed to a first surface of the airbag; and
   a deployment guide which penetrates the single deployment ring and is tightened by expansive force of the airbag to allow the airbag to be bent in a shape that protrudes toward a second surface of the airbag,
   wherein the deployment guide includes a first guide penetrating the single deployment ring and having upper and end lower ends fixed to the first surface of the airbag, and a second guide penetrating the single deployment ring and having upper and lower ends fixed to the first surface of the airbag.

2. The curtain airbag apparatus of claim 1, wherein a through hole through which the first guide and the second guide penetrate is formed in the single deployment ring.

3. The curtain airbag apparatus of claim 2, wherein the first guide and the second guide are installed to be movable through the through hole.

4. The curtain airbag apparatus of claim 1, wherein when the airbag is deployed, the first surface of the airbag is directed toward an outside of a vehicle, and the second surface of the airbag is directed toward an interior of the vehicle.

5. The curtain airbag apparatus of claim 1, wherein the upper end of the first guide and the upper end of the second guide are fixed to an upper end of the first surface of the airbag, and the lower end of the first guide and the lower end of the second guide are fixed to a lower end of the second surface of the airbag.

6. The curtain airbag apparatus of claim 5, wherein the single deployment ring is coupled to the lower end of the first surface of the airbag above the lower end of the first guide and the lower end of the second guide.

7. The curtain airbag apparatus of claim 1, wherein the lower end of the first guide is disposed to be closer to a front portion of the airbag than the upper end of first guide, and the lower end of the second guide is disposed to be closer to a rear portion of the airbag than the upper end of second guide.

8. The curtain airbag apparatus of claim 1, wherein a length of the first guide and a length of the second guide are longer than a length of the airbag in an up and down direction, and at least one end of the first guide and at least one end of the second guide are disposed to be spaced apart from the single deployment ring in a front and rear direction so that the first guide and the second guide are tightened while the airbag is deployed.

9. The curtain airbag apparatus of claim 1, wherein the upper end of the first guide and the upper end of the second guide are disposed to be spaced apart from each other in a front and rear direction, and the lower end of the first guide and the lower end of the second guide are disposed to be spaced apart from each other in the front and rear direction.

10. The curtain airbag apparatus of claim 1, wherein both ends of the first guide are disposed to be spaced forward apart from the single deployment ring, and both ends of the second guide are disposed to be spaced rearward apart from the single deployment ring.

11. A method of manufacturing a curtain airbag apparatus, the method comprising:
- spreading raw fabric of a single deployment ring out on a first surface of airbag, and fixing a central portion of the raw fabric of the single deployment ring to the first surface of the airbag;
- coupling both ends of the raw fabric, and completely forming the single deployment ring;
- spreading a first deployment guide out on the first surface of the airbag, and fixing a lower end of the first deployment guide to a lower end of the first surface of the airbag;
- spreading a second deployment guide out on the first surface of the airbag, and fixing a lower end of the second deployment guide to a lower end of the first surface of the airbag;
- allowing an upper end of the first deployment guide to pass through the single deployment ring from the lower side to the upper side, and pulling out the upper end of the first deployment guide;
- allowing an upper end of the second deployment guide to pass through the single deployment ring from the lower side to the upper side, and pulling out the upper end of the second deployment guide;
- folding a lower end of the first surface of the airbag upward so that the single deployment ring is disposed between folded portions of the airbag;
- fixing the upper end of the first deployment guide to an upper end of the first surface of the airbag; and
- fixing the upper end of the second deployment guide to an upper end of the first surface of the airbag.

12. The method of claim 11, wherein the airbag is folded upward based on a point one-third of the length of the airbag in an up and down direction from the lower end of the first surface of the airbag.

* * * * *